US010013714B2

(12) United States Patent
Dintenfass et al.

(10) Patent No.: US 10,013,714 B2
(45) Date of Patent: Jul. 3, 2018

(54) SYSTEM FOR SIMULATION AND IMPLEMENTATION OF DYNAMIC STATE-DEPENDENT RESOURCE RECONFIGURATION

(71) Applicant: Bank of America Corporation, Charlotte, NC (US)

(72) Inventors: Katherine Dintenfass, Charlotte, NC (US); Damon C. Missouri, Trenton, NJ (US); Cameron Darnell Wadley, Waxhaw, NC (US); Alexander C. Wittkowski, Charlotte, NC (US); Alicia C. Jones-McFadden, Fort Mill, SC (US); Angela Fritz Thompson, Matthews, NC (US)

(73) Assignee: Bank of America Corporation, Charlotte, NC (US)

( * ) Notice: Subject to any disclaimer, the term of this patent is extended or adjusted under 35 U.S.C. 154(b) by 401 days.

(21) Appl. No.: 14/851,623

(22) Filed: Sep. 11, 2015

(65) Prior Publication Data

US 2017/0076364 A1 Mar. 16, 2017

(51) Int. Cl.
*G06Q 40/00* (2012.01)
(52) U.S. Cl.
CPC .................... *G06Q 40/00* (2013.01)
(58) Field of Classification Search
CPC ..................................................... G06Q 40/00
USPC ............................................... 705/36 R, 312
See application file for complete search history.

(56) References Cited

U.S. PATENT DOCUMENTS

| | | |
|---|---|---|
| 5,930,764 A | 7/1999 | Melchione et al. |
| 5,983,205 A | 11/1999 | Brams et al. |
| 6,009,415 A | 12/1999 | Shurling et al. |
| 6,012,035 A | 1/2000 | Freeman, Jr. |
| 6,073,110 A | 6/2000 | Rhodes et al. |
| 6,088,686 A | 7/2000 | Walker et al. |
| 6,324,516 B1 | 11/2001 | Shults |
| 6,415,267 B1 | 7/2002 | Hagan |
| 6,513,018 B1 | 1/2003 | Culhane |
| 6,826,536 B1 | 11/2004 | Forman |
| 6,901,406 B2 | 5/2005 | Nabe et al. |
| 6,934,692 B1 | 8/2005 | Duncan |
| 6,938,013 B1 | 8/2005 | Gutierrez-Sheris |
| 7,155,411 B1 | 12/2006 | Blinn et al. |
| 7,340,401 B1 | 3/2008 | Koenig et al. |

(Continued)

OTHER PUBLICATIONS

European Patent Office, "Notice from the European Patent Office dated Oct. 1, 2007 concerning business methods" Official Journal EPO, Nov. 2007, pp. 592.

(Continued)

*Primary Examiner* — Samica L Norman
(74) *Attorney, Agent, or Firm* — Michael A. Springs; Moore & Van Allen PLLC; Peter B. Stewart

(57) ABSTRACT

Embodiments of the invention are directed to systems, methods, and computer program products for implementing a dynamic state-dependent resource reconfiguration, such as the reconfiguration of resources and assets that may occur with a relationship between a first user and a second user is terminated. Example embodiments include incorporating into the resource reconfiguration aspects of prior user agreements and simulating the expected outcome of the dynamic state-dependent resource reconfiguration.

20 Claims, 2 Drawing Sheets

(56) References Cited

U.S. PATENT DOCUMENTS

| | | | |
|---|---|---|---|
| 7,356,516 B2 | 4/2008 | Richey et al. |
| 7,395,219 B2 | 7/2008 | Strech |
| 7,401,040 B2 | 7/2008 | Sloan et al. |
| 7,421,408 B2 | 9/2008 | Ryder |
| 7,454,376 B1 | 11/2008 | Argenbright |
| 7,454,379 B1 | 11/2008 | Wolzenski et al. |
| 7,467,094 B2 | 12/2008 | Rosenfeld et al. |
| 7,475,032 B1 | 1/2009 | Patnode et al. |
| 7,490,059 B2 | 2/2009 | Albee et al. |
| 7,542,921 B1 | 6/2009 | Hildreth |
| 7,580,877 B1 | 8/2009 | Argenbright |
| 7,627,512 B2 | 12/2009 | Harris et al. |
| 7,657,441 B2 | 2/2010 | Richey et al. |
| 7,720,754 B1 | 5/2010 | Gutierrez-Sheris |
| 7,783,545 B2 | 8/2010 | Sloan et al. |
| 7,783,566 B2 | 8/2010 | Armes et al. |
| 7,805,363 B2 | 9/2010 | Haggerty et al. |
| 7,809,625 B1 | 10/2010 | Thermond et al. |
| 7,844,523 B2 | 11/2010 | Torre et al. |
| 7,848,939 B1 | 12/2010 | Martin |
| 7,856,361 B1 | 12/2010 | Bell |
| 7,873,566 B1 | 1/2011 | Templeton et al. |
| 7,890,397 B1 | 2/2011 | Pena |
| 7,899,750 B1 | 3/2011 | Klieman et al. |
| 7,904,362 B1 | 3/2011 | Smith |
| 7,921,048 B2 | 4/2011 | Sloan et al. |
| 7,930,195 B2 | 4/2011 | Heyns et al. |
| 7,937,305 B1 | 5/2011 | Lego et al. |
| 7,987,101 B2 | 7/2011 | Cina et al. |
| 8,024,213 B1 | 9/2011 | Fano et al. |
| 8,032,932 B2 | 10/2011 | Speyer et al. |
| 8,069,103 B1 | 11/2011 | Davis |
| 8,121,947 B1 | 2/2012 | Barth et al. |
| 8,171,531 B2 | 5/2012 | Buer |
| 8,190,502 B2 | 5/2012 | Moran et al. |
| 8,204,834 B2 | 6/2012 | Racanelli et al. |
| 8,214,276 B1 | 7/2012 | Preece et al. |
| 8,234,194 B2 | 7/2012 | Mele et al. |
| 8,239,223 B1 | 8/2012 | Martin |
| 8,249,985 B2 | 8/2012 | Giordano et al. |
| 8,255,316 B2 | 8/2012 | Bal et al. |
| 8,271,364 B2 | 9/2012 | Nobili et al. |
| 8,301,469 B1 | 10/2012 | Veldhuizen et al. |
| 8,301,501 B1 | 10/2012 | Glaeser et al. |
| 8,327,428 B2 | 12/2012 | Bailey et al. |
| 8,346,666 B2 | 1/2013 | Lindelsee et al. |
| 8,370,243 B1 | 2/2013 | Cernyar |
| 8,380,544 B1 | 2/2013 | Hopkins, III |
| 8,407,142 B1 | 3/2013 | Griggs |
| 8,429,050 B1 | 4/2013 | Willard et al. |
| 8,447,692 B2 | 5/2013 | Thomas et al. |
| 8,473,410 B1 | 6/2013 | Haggerty et al. |
| 8,498,940 B2 | 7/2013 | Pelegero et al. |
| 8,527,382 B2 | 9/2013 | McDonough et al. |
| 8,538,875 B2 | 9/2013 | Seib et al. |
| 8,572,689 B2 | 10/2013 | Radhakrishnan |
| 8,590,008 B1 | 11/2013 | Ellmore |
| 8,595,812 B2 | 11/2013 | Bomar et al. |
| 8,666,836 B2 | 3/2014 | Adams |
| 8,682,753 B2 | 3/2014 | Kulathungam |
| 8,731,583 B2 | 5/2014 | Wengrovitz |
| 8,732,004 B1 | 5/2014 | Ramos et al. |
| 8,751,346 B2 | 6/2014 | Maisonneuve |
| 8,768,736 B1 | 7/2014 | Chapman et al. |
| 8,788,429 B2 | 7/2014 | Tieken |
| 8,789,162 B2 | 7/2014 | Radhakrishnan |
| 8,833,639 B1 | 9/2014 | Hopkins, III |
| 8,839,383 B2 | 9/2014 | Van Horn |
| 8,903,739 B1 | 12/2014 | Janiczek |
| 8,918,306 B2 | 12/2014 | Cashman et al. |
| 8,930,253 B1 | 1/2015 | Ball |
| 8,943,574 B2 | 1/2015 | Bailey et al. |
| 9,055,053 B2 | 6/2015 | Radhakrishnan |
| 9,064,284 B1 | 6/2015 | Janiszeski et al. |
| 9,069,943 B2 | 6/2015 | Radhakrishnan et al. |
| 2002/0049670 A1 | 4/2002 | Moritsu et al. |
| 2002/0077867 A1 | 6/2002 | Gittins et al. |
| 2002/0147669 A1 | 10/2002 | Taylor et al. |
| 2002/0178100 A1* | 11/2002 | Koveos .............. G06Q 40/02 705/36 R |
| 2003/0130873 A1 | 7/2003 | Nevin et al. |
| 2003/0225690 A1 | 12/2003 | Eaton |
| 2003/0233292 A1 | 12/2003 | Richey et al. |
| 2004/0078321 A1 | 4/2004 | Lawrence |
| 2004/0153382 A1 | 8/2004 | Boccuzzi et al. |
| 2005/0027544 A1 | 2/2005 | Newstead et al. |
| 2005/0044017 A1 | 2/2005 | Foss, Jr. et al. |
| 2005/0044028 A1 | 2/2005 | Torres |
| 2005/0055275 A1 | 3/2005 | Newman et al. |
| 2005/0267827 A1 | 12/2005 | Grant, Jr. et al. |
| 2005/0288941 A1 | 12/2005 | DuBois et al. |
| 2006/0074788 A1 | 4/2006 | Grizack et al. |
| 2007/0192143 A1 | 8/2007 | Krishnan et al. |
| 2007/0219875 A1 | 9/2007 | Toulotte |
| 2008/0046349 A1 | 2/2008 | Elberg et al. |
| 2008/0059351 A1 | 3/2008 | Richey et al. |
| 2008/0071556 A1 | 3/2008 | Cina et al. |
| 2009/0083638 A1 | 3/2009 | Gupta |
| 2010/0063908 A1 | 3/2010 | Racanelli et al. |
| 2010/0138359 A1 | 6/2010 | Alter |
| 2010/0161467 A1 | 6/2010 | Ageenko et al. |
| 2010/0161600 A1 | 6/2010 | Higgins et al. |
| 2010/0268645 A1 | 10/2010 | Martino et al. |
| 2011/0238553 A1 | 9/2011 | Raj et al. |
| 2012/0016817 A1 | 1/2012 | Smith et al. |
| 2012/0053987 A1 | 3/2012 | Satyavolu et al. |
| 2012/0101852 A1 | 4/2012 | Albert |
| 2012/0284201 A1 | 11/2012 | Racanelli et al. |
| 2013/0060617 A1 | 3/2013 | Ross et al. |
| 2013/0066754 A1 | 3/2013 | Atwood |
| 2013/0159132 A1 | 6/2013 | Adams |
| 2013/0290198 A1 | 10/2013 | Vassil |
| 2014/0081816 A1 | 3/2014 | Kuznetsov |
| 2014/0081885 A1 | 3/2014 | Maxwell, II |
| 2014/0101060 A1* | 4/2014 | Calman .............. G06Q 50/18 705/312 |
| 2014/0115064 A1 | 4/2014 | Calman et al. |
| 2014/0143076 A1 | 5/2014 | Gangi |
| 2014/0164287 A1 | 6/2014 | Hyde et al. |
| 2014/0310142 A1 | 10/2014 | Mak |
| 2014/0330691 A1 | 11/2014 | Samano Palacios |
| 2014/0379272 A1 | 12/2014 | Sathe |
| 2015/0081405 A1 | 3/2015 | Ross et al. |
| 2015/0206055 A1 | 7/2015 | Sengupta et al. |
| 2016/0110813 A1 | 4/2016 | Hayden |
| 2016/0379298 A1 | 12/2016 | Isaacson et al. |
| 2017/0076283 A1 | 3/2017 | Dintenfass et al. |

OTHER PUBLICATIONS

Jordan, Arthur, "Database Marketing Builds in Relationships with Members," Credit Union News (May 5, 1995), vol. 15, Issue 9, retrieved from the internet on May 8, 2012, 2 pages.

"Putting Customer Benefit First—to Provide Faster ROA-SAS Institute's Data Warehousing Practice Solves Business Problems", Copyright Business Wire, May 19, 1998, retrieved from the internet on May 8, 2012, 3 pages.

Synder, Daniel, "From List Fatigue to Relationship Marketing: The Credit Card industry Reassesses Its Direct Mail Strategies", Credit World, (Nov./Dec. 1997), pp. 27-30.

Quicken Willmaker Plus Estate Planning Essentials, Nolo, Sep. 2007.

* cited by examiner

SYSTEM FOR SIMULATION AND IMPLEMENTATION OF DYNAMIC STATE-DEPENDENT RESOURCE RECONFIGURATION

BACKGROUND

Planning for and determining how a couple's resources will be divided and reconfigured in the event that the individuals in the couple change the nature of their relationship is an important aspect implementing the transition by the individuals in the couple from one relationship state to another. However, despite the importance of predictable resource reconfiguration behavior under dynamic relationship conditions, the technology associated with such resource reconfiguration is still a limited area.

BRIEF SUMMARY

Embodiments of the present invention address the above needs and/or achieve other advantages by providing apparatuses (e.g., a system, computer program product, and/or other device) and methods for a system that enables a pair of individual users to implement a dynamic state-dependent resource reconfiguration, such that upon a change in the relationship state between the individuals, resources that were previously held jointly or in common between the pair of individual users can be reallocated and reconfigured to reflect the change in the relationship state and, in some instances, reflect a preexisting agreement between the individual users.

Embodiments of the invention comprise systems, computer program products, and methods for implementing a dynamic state-dependent resource reconfiguration. These embodiments comprise receiving a request from a first user to implement a state-dependent resource reconfiguration; receiving a request from a second user to implement the state-dependent resource reconfiguration, wherein the second user and the first user are in a relationship that is characterized by a joint ownership by the first user and the second user of a plurality of shared assets; and initiating the state-dependent resource reconfiguration.

In some example implementations, initiating the state-dependent resource reconfiguration comprises identifying a first set of assets and a second set of assets, wherein the first set of assets comprises a first plurality of assets and wherein the second set of assets comprises a second plurality of assets, and wherein the first set of assets and the second set of assets are mutually exclusive and wherein a combination of the first plurality of assets and the second plurality of assets comprises the plurality of shared assets; assigning the first set of assets to the first user and assigning the second set of assets to the second user; changing an identification of a first beneficiary associated with the first set of assets and an identification of a second beneficiary associated with the second set of assets such that the second user is not identified as the first beneficiary and that the first user is not identified as the second beneficiary; and blocking the first user from accessing the second set of assets and blocking the second user from accessing the first set of assets. Some example embodiments further comprise blocking all access by the first user and the second user to the plurality of shared assets.

In some example implementations, embodiments are further configured to label and categorize one or more resources. Some such embodiments comprise receiving a set of asset category labels comprising a plurality of asset category labels, wherein the set asset category labels are associated with a preexisting agreement between the first user and the second user; and applying one or more of the plurality of asset category labels to each shared asset within the plurality of shared assets. In some such example embodiments comprise assigning each shared asset from among the plurality of shared assets to the first user or to the second user based at least in part on the one or more category label applied to each asset from among the plurality of shared assets.

Some example embodiments comprise modeling the state-dependent resource reconfiguration prior to implementing the resource reconfiguration. In some such embodiments, prior to initiating the state-dependent resource reconfiguration, the example embodiments comprise presenting to the first user and the second user a model depicting an outcome of the state-dependent resource reconfiguration, wherein the outcome comprises a listing of the first plurality of assets and the second plurality of assets. In some example implementations of such embodiments, the outcome further comprises a simulation of an expected cash flow associated with the first user and an expected cash flow associated with the second user.

Some example embodiments, in addition to modeling the state-dependent resource reconfiguration, comprise a communication feature, wherein the individual user can individually or jointly communicate with an independent third party, who may be able to answer questions or provide guidance to one or both of the users regarding resource allocation and management. Some such example implementations comprise establishing a first communication channel between a user device associated with the first user and a user device associated with a third user; establishing a second communication channel between a user device associated with the second user and the user device associated with the third user, wherein the third user is unaffiliated with first user and is unaffiliated with the second user.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
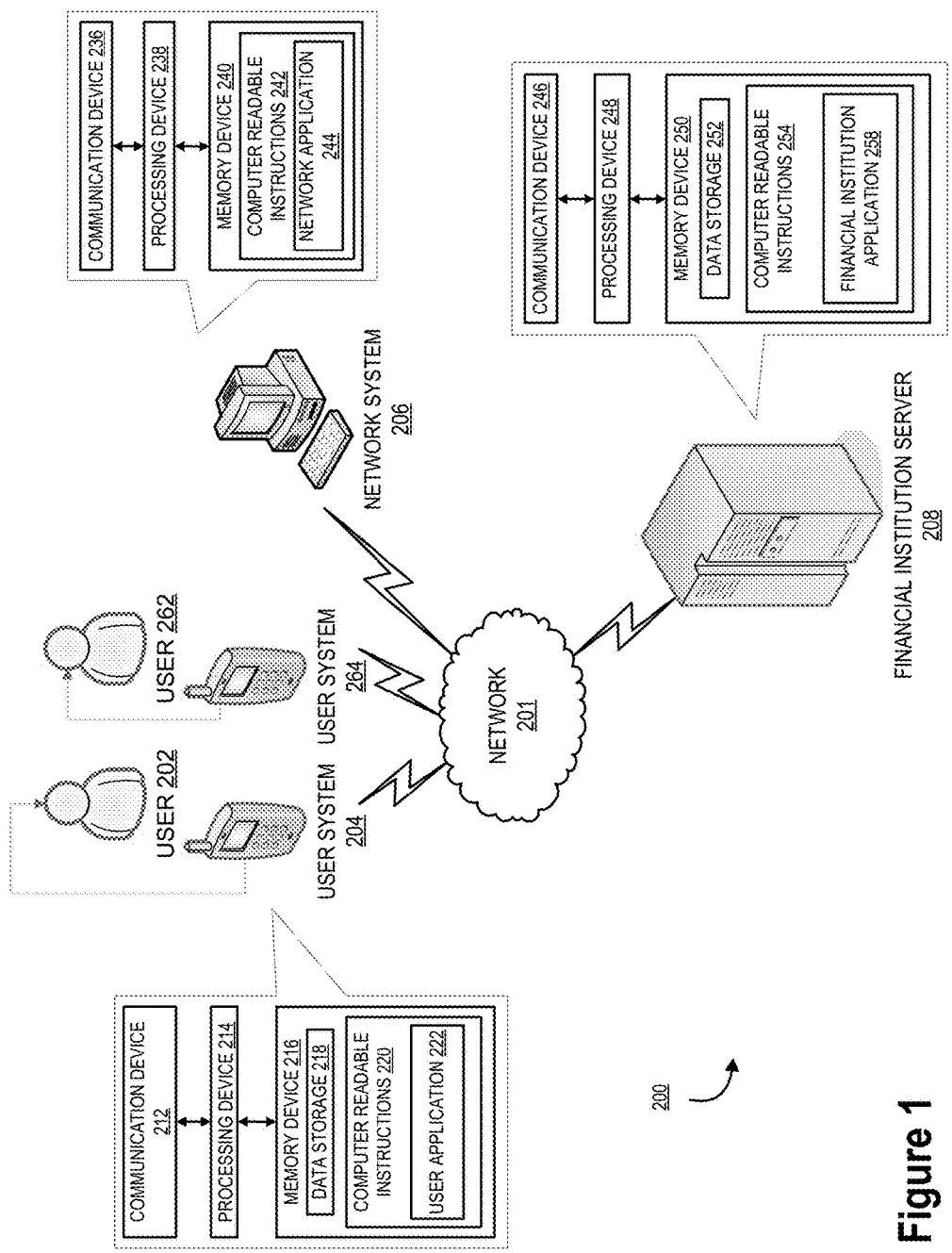
Figure 2:
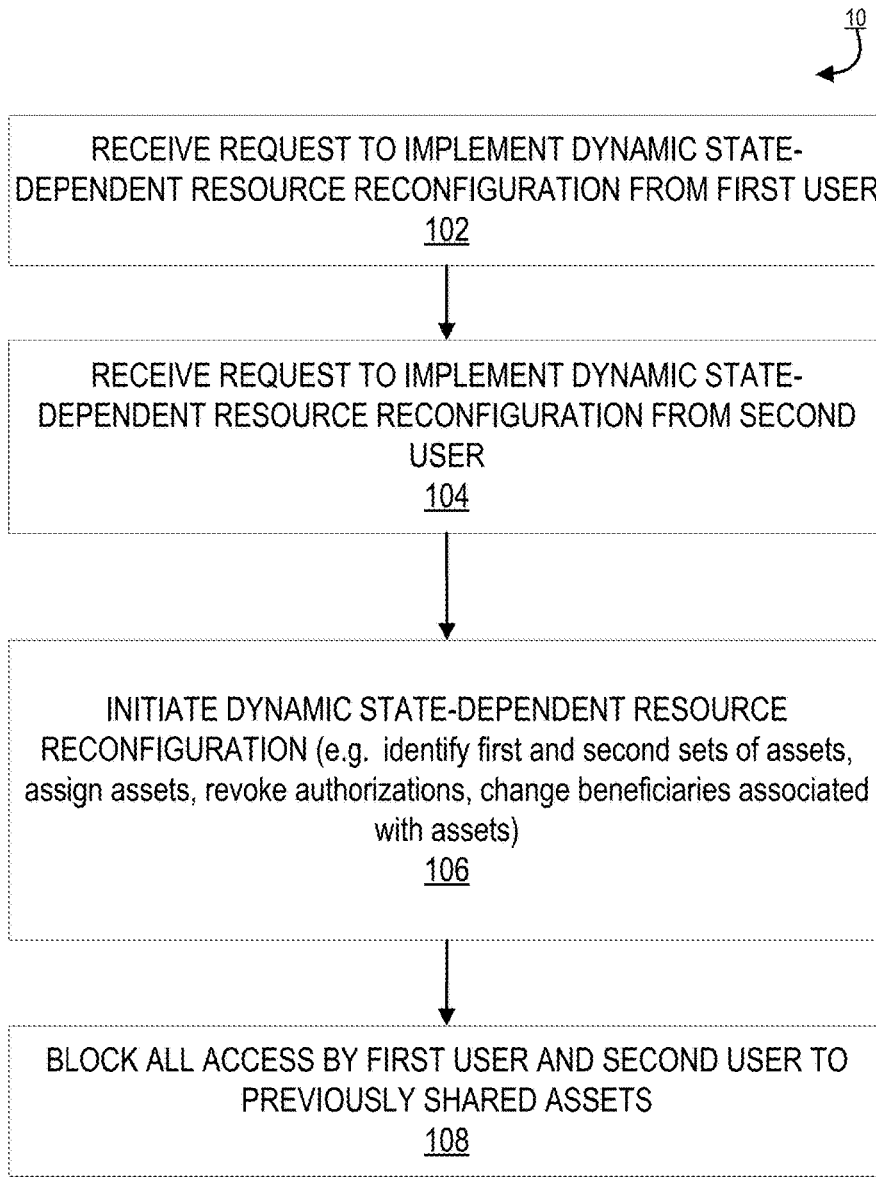

Having thus described embodiments of the invention in general terms, reference will be made to the accompanying drawings, where:

FIG. 1 presents a block diagram of the dynamic state-dependent resource reconfiguration system environment for implementing the process flows described herein, in accordance with embodiments of the present invention;

FIG. 2 illustrates a process flow for implementing a dynamic state-dependent resource reconfiguration, in accordance with embodiments of the present invention.

DETAILED DESCRIPTION OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

Although some embodiments of the invention herein are generally described as involving a "financial institution," one of ordinary skill in the art will appreciate that other embodiments of the invention may involve other businesses that take the place of or work in conjunction with the financial institution to perform one or more of the processes or steps described herein as being performed by a financial institution. Still in other embodiments of the invention, the financial institution described herein may be replaced with other types of businesses that may be associated with a state-dependent resource reconfiguration.

Some portions of this disclosure are written in terms of a financial institution's unique position with respect to user transactions. As such, a financial institution may be able to utilize its unique position to monitor and identify transactions for products or with merchants that utilize financial institution accounts to complete the transactions.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with implementation and modification of state-dependent resource reconfigurations.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

As used herein, the term "dynamic state-dependent resource reconfiguration" refers to any change in the configuration of one or more resources based on a change in a state of a relationship between two individuals. A paradigmatic dynamic state-dependent resource reconfiguration is the partitioning, and/or reassignment of assets amongst two married individuals when the individuals choose to effectuate a divorce. Often, finalizing a divorce includes the reallocation and recategorization of assets that were previously jointly held by the individuals, such that permissions, authorizations, beneficiary identifications, powers of attorney, and other aspects of accounts and other resources are adjusted to reflect the change in relationship status of the individuals. Those skilled in the art will appreciate that such reconfigurations are dynamic and state-dependent, in that the reconfiguration only occurs upon a change in the relationship state of the individuals whom jointly own one or more resources. While many of the examples included herein are presented in the context of a couple contemplating or executing a divorce, it will be appreciated that the systems, methods, processes, and other disclosures contained herein may apply to any of a number of other contexts where assets are held jointly between two or more individuals, such as business partners, individuals who have entered into formal or informal joint ownership agreements, and other situations where one or more assets are held jointly.

Embodiments of the present invention are directed toward implementing aspects of dynamic state-dependent resource reconfigurations. Historically, the division of assets that accompanies a change in relationship and/or marital status can be stressful and the source of conflict amongst individuals in and/or associated with the relationship. While some couples attempt to rely on prenuptial agreements, separation agreements, and/or other agreements to attempt to establish rules for the division of assets upon divorce, the time, effort, and resources involved with implementing a division of assets can be time-consuming and costly. This is especially true for modern couples, particularly those who have engaged in some degree of joint financial planning. For example, where couples have established joint bank accounts, named each other as beneficiaries of insurance plans and/or retirement accounts, or established other financial structures designed around the needs and practices of a married couple, the efforts necessary to change beneficiaries, account permissions, and other authorizations can be substantial.

Consequently, the embodiments of the invention claimed and otherwise described herein are directed to solutions that assist individuals transitioning out of a joint relationship, in ensuring that a dynamic state-dependent resource reconfiguration can be implemented and effectuated in a manner that is consistent with the understandings of the individuals involved.

FIG. 1 illustrates a system environment 200, for use in connection with the implementation of one or more dynamic state-dependent resource reconfigurations in accordance with one embodiment of the present invention. FIG. 1 provides the system environment 200 for which example instances the elements and/or processes described herein may be implemented. FIG. 1 provides a unique system that includes specialized servers and system communicably linked across a distributive network that may allow a user, via a user's mobile device, to communicate with systems and servers associated with one or more entities and institutions associated with a dynamic state-dependent resource reconfiguration and/or the processes described and disclosed herein. The system environment 200 may also provide for the authorization and authentication of a user. The system, with its communicably linked diffusible network may, in some embodiments, improve a general computing device if utilized thereon by improving the ability for the computer device to access and securely transmit and/or present information associated with a dynamic state-dependent resource reconfiguration, particularly with respect to the modeling thereof. Furthermore, in some embodiments, the system may be, as described below, run on a diffusion network of specialized nodes meant for implementing a dynamic state-dependent resource reconfiguration.

As illustrated in FIG. 1, the financial institution server 208 is operatively coupled, via a network 201 to the user system 204, and to the network system 206. In this way, the financial institution server 208 can send information to and receive information from the user system 204 and the network system 206 to implement a dynamic state-dependent resource reconfiguration upon user device authentication. FIG. 2 illustrates only one example of an embodiment of the system environment 200, and it will be appreciated that in other embodiments one or more of the systems, devices, or servers may be combined into a single system, device, or server, or be made up of multiple systems, devices, or servers.

The network 201 may be a system specific distributive network receiving and distributing specific network feeds and identifying specific network associated triggers. The network 201 may also be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 is an individual consumer that is associated with a dynamic state-dependent resource reconfiguration. In some embodiments, the user 202 may request and/or interact with a dynamic state-dependent resource reconfiguration using a user system 204.

FIG. 1 also illustrates a user system 204. The user system 204 generally comprises a communication device 212, a processing device 214, and a memory device 216. The user system 204 is a computing system that allows a user 202 to interact with the financial institution to request, model, and/or implement a dynamic state-dependent resource reconfiguration and implement changes thereto. The processing device 214 is operatively coupled to the communication device 212 and the memory device 216. The processing device 214 uses the communication device 212 to communicate with the network 201 and other devices on the network 201, such as, but not limited to the network system 206 and the financial institution server 208. As such, the communication device 212 generally comprises a modem, server, or other device for communicating with other devices on the network 201.

The user system 204 comprises computer-readable instructions 220 and data storage 218 stored in the memory device 216, which in one embodiment includes the computer-readable instructions 220 of a user application 222. In this way, a user 202 may interact and change parameters associated with a dynamic state-dependent resource reconfiguration using the user system 204 via an application operating on the user system 204. Furthermore, the user application 222 may receive a token from the financial institution server 208 or network system 206 and be stored on the memory device 216 of the user system 204. The user system 204 via the user application 222 may decrypt the token to access information required to complete a dynamic state-dependent resource reconfiguration. The user system 204 may be, for example, a desktop personal computer, a mobile system, such as a cellular phone, smart phone, personal data assistant (PDA), laptop, or the like.

As further illustrated in FIG. 1, second user 262 and second user system 264 are present in the system environment 200. It will be appreciated that many of the embodiments disclosed and discussed herein contemplate two individuals (for example, married individuals or business partners) who are considering and/or chosen to transition out of their current marital and/or business status. It will also be appreciated that aspects and attributes of the user 202 and the user system 204 are applicable to second user 262 and second user system 264 even though the detailed aspects of the user system 204 have not, for the sake of clarity, been reproduced in connection with second user system 264.

As further illustrated in FIG. 1, the financial institution server 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the network system 206 and the user system 204. As such, the communication device 246 generally comprises a modem, server, or other device for communicating with other devices on the network 201.

As further illustrated in FIG. 1, the financial institution server 208 comprises computer-readable instructions 254 stored in the memory device 250, which in one embodiment includes the computer-readable instructions 254 of a financial institution application 258. In some embodiments, the memory device 250 includes data storage 252 for storing data related to the system environment, but not limited to data created and/or used by the financial institution application 258.

In the embodiment illustrated in FIG. 1 and described throughout much of this specification, the financial institution application 258 may allow for implementations of a dynamic state-dependent resource reconfiguration, contact user system 204 for security confidence, and/or push a token to user system 204 for storage and decryption on user system 204 for use in connection with implementing a dynamic state-dependent resource reconfiguration.

In some embodiments, the financial institution application 258 may allow for approval of a dynamic state-dependent resource reconfiguration. In some embodiments, the financial institution application 258 may receive a request to implement a dynamic state-dependent resource reconfiguration via the network 201 from the user 202 via the user system 204 and/or from the second user 262 via the second user system 264. The financial institution application 258 may approve the request after the request is submitted based on a stored standardized request acceptance criteria stored in the memory 250. In some embodiments, this approval by the financial institution application 258 may be instantaneous upon receiving the request.

In some embodiments, the financial institution application 258 may present approval to an online application associated with the user 202. As such, once the financial institution application 258 has approved the request from user 202 to implement a dynamic state-dependent resource reconfiguration, the financial institution application 258 may provide information about accessing and authorizing the use of resources. The financial institution application 258 may provide this information via an online banking interface associated with the financial institution server 208 and the user's accounts at the financial institution. As such, the financial institution application 258 may provide the user 202 with the information via communication over the network 201 via data feeds to the user system 204. Once the user 202 is authenticated into an online application platform, the financial institution application 258 may provide information about accessing and authorizing the use of a reconfigured resource instantaneously.

In some embodiments, the financial institution application 258 may receive other information about the user 202, such as transaction information and/or information posted by the user 202 on publicly available sources, or from sources that the user 202 has specifically authorized the one or more institutions to view. As such, the financial institution application 258 may receive network data feeds or communications from the user 202 via a user system 204 over the network 201.

In some embodiments, the financial institution application 258 may determine the unique identity of the user system 204 and/or other devices associated with the request to implement a dynamic state-dependent resource reconfiguration and contact the devices for security confidence. In some embodiments, the financial institution application 258 may communicate with the user system 204 and/or other systems to identify the user system 204 and/or the user 202. The financial institution application 258 may then initiate a security check on the devices. The security check generates a security confidence rating to confirm that the device requesting to implement a dynamic state-dependent resource reconfiguration is a device associated with the user and is not corrupted with viruses, malware, or the like. As such, the financial institution application 258 communicates and provides codes for download on the user system 204 that maybe encrypted and subsequently decrypted by the user system 204 for system monitoring and malware searching. As such, the security check and subsequently generated security confidence rating ensures that misappropriation of a reconfigured resource cannot occur. As such, the security check may, in some embodiments, provide code and/or access information about the requesting device, based on the identifier of each device. The financial institution application 258 may confirm the operating system of the device, the health of the device, and determine an IP address or location match between the devices the user uses to log into online banking applications and the requesting device. In some embodiments, the financial institution application 258 may generate a security confidence rating based on the security check that rates the security of authorizing the dynamic state-dependent resource reconfiguration.

As illustrated in FIG. 2, the network system 206 is connected to the financial institution server 208 and may be associated with an individual or group of individuals qualified to verify and identity and/or a signature or signed document associated with the user 202. In this way, while only one network system 206 is illustrated in FIG. 1, it is understood that multiple network systems may make up the system environment 200. The network system 206 generally comprises a communication device 236, a processing device 238, and a memory device 240. The network system 206 comprises computer-readable instructions 242 stored in the memory device 240, which in one embodiment includes the computer-readable instructions 242 of a network application 244.

In the embodiment illustrated in FIG. 1, the network application 244 provides, in some embodiments, token creation and distribution. In some embodiments the network application 244 may create and distribute a token for storage on the user system 204 and financial institution server 208. The token may include code therein that includes authorization information associated with a dynamic state-dependent resource reconfiguration. As such, the token may be stored in the memory 216 of the user system 204 and subsequently decrypted to be used by the user system 204 as an indicator of the identity and authority of the user 202 to implement a dynamic state-dependent resource reconfiguration. The token may also be stored and decrypted by the financial institution system 208 for reconciliation and processing of a request from the user 202 to change a parameter of a dynamic state-dependent resource reconfiguration.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2 provides a high-level process flow illustrating the implementation of a process 10 to implement a dynamic state-dependent resource reconfiguration in accordance with one embodiment of the invention. As illustrated in block 102, process 10 comprises receiving a request from a first user to implement a state-dependent resource reconfiguration. In many example implementations, the first user will be an individual who is in a relationship, such as a marriage, with another individual. In some example implementations, the request from the first user to implement a dynamic state-dependent resource reconfiguration will be received via a message sent over a communication channel established between a user's mobile device and a system environment configured to receive and process requests for such resource reconfigurations, such as the systems discussed above with respect to FIG. 1.

As illustrated in block 104, process 10 comprises receiving a request from a second user to implement the state-dependent resource reconfiguration. In many example implementations, the second user and the first user will be in a relationship that is characterized by a joint ownership by the first user and the second user of a plurality of shared assets. For example, the first user and the second user may be married, and jointly own, as among a plurality of shared assets, one or more savings accounts, checking accounts, credit accounts, retirement accounts, insurance policies, and/or other joint assets.

As illustrated in block 106, process 10 also comprises initiating the state-dependent resource reconfiguration. In some example implementations, initiating the state-dependent resource reconfiguration comprises identifying a first set of assets and a second set of assets, wherein the first set of assets comprises a first plurality of assets and wherein the second set of assets comprises a second plurality of assets, and wherein the first set of assets and the second set of assets are mutually exclusive and wherein a combination of the first plurality of assets and the second plurality of assets comprises the plurality of shared assets. In such example implementations, all of the shared assets are divided such that each of the shared assets is associated with either the first set of assets or the second set of assets, but not both. In this manner, the resources and other assets held jointly by the users can be completely divided. In some implementations, such as instances where a portions of the assets in a single joint account are to be distributed amongst the users, those portions may be separately identified in the respective sets of assets. In some example implementations of block 106, initiating the state-dependent resource reconfiguration comprises assigning the first set of assets to the first user and assigning the second set of assets to the second user. In such example implementations, the users take ownership of a set of assets, effectuating a conversion of previously joint assets into individually-owned assets. In some such example implementations of block 106, initiating the state-dependent resource reconfiguration comprises blocking the first user from accessing the second set of assets and blocking the second user from accessing the first set of assets. For example, blocking a user from accessing the assets of the other user may be accomplished by revoking authorizations that a user held in an asset that was previously jointly held.

In some example implementations, one or more assets that is and/or was jointly held by the first user and the second user will be set aside for division or some other operation to occur after users implement a divorce or other separation. For example, a house or other real estate asset held jointly may be held until market conditions are such that the sale of the asset is more advantageous to the users. In some such example implementations, setting aside the asset may include the establishment of rules and/or the identification of triggering events (such as a change in appraised or estimated value, reaching a threshold value on an outstanding mortgage, the resolution of a tax valuation adjustment, or other event) that can be used to prompt the sale or distribution of the asset.

In some example implementations of block 106, initiating the state-dependent resource reconfiguration comprises changing an identification of a first beneficiary associated with the first set of assets and an identification of a second beneficiary associated with the second set of assets such that the second user is not identified as the first beneficiary and that the first user is not identified as the second beneficiary. In many instances, joint accounts or other assets that are joint held by two individuals are structured such that each individual joint owner of the asset names (either affirmatively or automatically) the other individual joint owner as the beneficiary of the asset, such that the asset is transferred in whole to the that individual upon death or some other event. Consequently, in some example implementations of block 106, the beneficiaries identified on one or more assets in the divided first set of assets and the second set of assets are modified such that the assets are not inadvertently designated to revert to joint status or otherwise operate like a joint asset.

In some example implementations of process 10, the users may desire that the shared assets be frozen, either before or after division of the assets. For example, as depicted in block 108 process 10 may comprise blocking all access by the first user and the second user to the plurality of shared assets. In such example implementations, blocking access to the shared assets, namely "freezing" them, can be used to maintain the value of the shared assets and ensure that the shared assets are not inadvertently misdirected and/or otherwise misallocated.

Those skilled in the art will recognize that some couples enter into prenuptial agreements, post-separation agreements, or other agreements that are intended to govern the distribution of a couple's joint assets upon the termination of the marital relationship between the members of the couple. In some such instances, the agreement or agreements between the individuals will attempt to categorize certain assets to identify or direct how certain assets should be partitioned and/or assigned in the event of a termination of the relationship between the parties to the agreement. In some such instances, there may also be an official decree or other order establishing a change in relationship between the users and providing for how certain assets should be divided. Example implementations of the systems and processes described herein contemplate receiving and using one or more preexisting agreements between individuals and/or operative orders and decrees, including but not limited to the categorization of assets contained in such agreements, to guide the initiation of the state-dependent resource reconfiguration. In some such example implementation, the agreements or other operative documents can be parsed and reviewed, either manually by an individual or group of individuals and/or automatically, such as through the use of character recognition technology and/or other document reading technology that is capable of identifying and recognizing text in a document and processing the information in the text. Consequently, some example implementations of an initiation of a state-dependent resource reconfiguration comprise receiving a set of asset category labels comprising a plurality of asset category labels, wherein the set asset category labels are associated with a preexisting agreement between the first user and the second user; and applying one or more of the plurality of asset category labels to each shared asset within the plurality of shared assets. In some such example implementations, initiation of a state-dependent resource reconfiguration comprises assigning each shared asset from among the plurality of shared assets to either the first user or the second user based at least in part on the one or more category label applied to each asset from among the plurality of shared assets. In such implementations, the assets that are assigned to the first user and the second user, respectively, will reflect the categorization identified in a preexisting agreement between the first user and the second user.

In addition to implementing and initiating a state-dependent resource reconfiguration, it is possible to model the likely outcome of a state-dependent resource reconfiguration. Those skilled in the art will recognize that the termination of a relationship can have a significant impact on the financial characteristics of the individuals who were associated with that relationship. For example, individuals who formerly lived together may need to find separate residences, and incur different and/or additional costs and expenditures than they did when in the relationship. These, and other impacts on the financial characteristics on an individual can be difficult for an individual to predict without the assistance of a model that is able to take into account information about the individual, costs incurred by other potentially similarly-situated individuals, and data regarding the individual's assets, geographic location, and other aspects of the market environment in which the individual resides. In some situations, such as situations where the individuals associated with a relationship are unfamiliar with their assets, the laws governing the partitioning of those assets, and/or the likely financial issues that may arise after the termination of a marriage, modeling the state-dependent resource reconfiguration in advance to completing a divorce and/or reconfiguring resources may be beneficial.

In some implementations, prior to initiating the state-dependent resource reconfiguration, a model depicting an outcome of the state-dependent resource reconfiguration in presented to the first user and the second user. In some implementations, the outcome presented in the model comprises a listing of the first plurality of assets and the second plurality of assets. In such relatively simple models, the users are simply shown how the assets will be divided if they proceed with state-dependent resource reconfiguration. This may permit the users to reconsider their chosen course of action, or take steps to adjust how one or more assets will be treated upon dissolution of the marriage.

In some more advanced implementations, the outcome presented to the users further comprises a simulation of an expected cash flow associated with the first user and an expected cash flow associated with the second user. In situations where the model is able to access financial and other data associated with the users, such as account balances, income statements, transaction patterns, statements and other data presented on social media sites or other publicly available sources of data, location-related financial information, such as local cost-of-living data, it may be possible to identify and incorporate into the model the likely cash flows that each user will be likely to experience after implementation of the state-dependent resource reconfiguration. After being presented with such information, the users may be able to plan for adjustments to their respective financial plans, adjust the parameters of the state-dependent resource reconfiguration, and/or take other steps to ensure that implementation of the state-dependent resource reconfiguration comports with the user's expectations and needs.

As part of modeling the state-dependent resource reconfiguration, users may also decide to use a model as the basis for forming a formal agreement, such as a pre-nuptial, post-separation, or business termination agreement, that governs the division of assets amongst the individuals. In some such situations, the information developed in and derived from the model, such as how jointly held assets should be divided and reallocated, can be documented and placed into a document that the individuals can themselves, or with the assistance of a third party, incorporate into an agreement.

As part of modeling the state-dependent resource reconfiguration, users may decide that it would be beneficial to talk to a third party, such as a financial advisor, or one or more individuals who are similarly situated to the users and may be able to provide guidance or other information regarding the outcome of a state-dependent resource reconfiguration. Consequently, in some example implementations, a first communication channel between a user device associated with the first user and a user device associated with a third user is established. A second communication channel between a user device associated with the second user and the user device associated with the third user may also be established. In some such implementations, communication between the first or second user and the third user may be private, such that a communication between the first user and the third user (or between the second user and the third user) is not available to the other user. In some implementations, communications from all users will be available to all users, such that the first and second user can communicate with each other and the third user simultaneously. In some implementations, the third user will be unaffiliated with first user and will be unaffiliated with the second user. In some such implementations, the third user may be considered by the first user and the second user to be neutral, objective party capable of providing reliable advice.

INCORPORATION BY REFERENCE

To supplement the present disclosure, this application further incorporates entirely by reference the following commonly assigned patent applications:

| Docket Number | U.S. patent application Ser. No. | Title | Filed On |
|---|---|---|---|
| 6810US1.014033.2511 | 14/851,750 (now published as U.S. patent application Publication No. 2017/0076378) | SYSTEM FOR RESTRUCTURING BASED ON PREDICTIVE ANALYSIS | Concurrently Herewith |
| 6811US1.014033.2512 | 14/851,758 (now published as U.S. patent application Publication No. 2017/0076366) | UNIVERSAL TOKENIZATION SYSTEM | Concurrently Herewith |
| 6812US1.014033.2513 | 14/851,599 (now published as U.S. patent application Publication No. 2017/0076283) | SYSTEM FOR MODELING AND IMPLEMENTING EVENT-RESPONSIVE RESOURCE ALLOCATION STRUCTURES | Concurrently Herewith |
| 6815US1.014033.2515 | 14/851,848 (now published as U.S. patent application Publication No. 2017/0076380) | SYSTEM FOR DYNAMIC VISUALIZATION OF INDIVIDUALIZED CONSUMPTION ACROSS SHARED RESOURCE ALLOCATION STRUCTURE | Concurrently Herewith |
| 6817US1.014033.2516 | 14/851,765 (now published as U.S. patent application Publication No. 2017/0076379) | SYSTEM FOR ANALYZING PRE-EVENT AND POST-EVENT INDIVIDUAL ACCOUNTS AND TRANSFORMING THE ACCOUNTS | Concurrently Herewith |
| 6818US1.014033.2517 | 14/851,769 (now published as U.S. patent application Publication No. 2017/0076271) | SYSTEM FOR OPENING AND CONSOLIDATING ACCOUNTS BASED ON AN EVENT ASSOCIATED WITH THE ACCOUNT HOLDER | Concurrently Herewith |

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for implementing a state-dependent resource reconfiguration, the system comprising:
   a memory device with non-transitory computer readable program code stored thereon;
   a communication device;
   a processing device operatively coupled to the memory device and the communication device within a network, wherein the processing device is configured to execute the computer-readable program code to:
   establish a first communication channel with a first mobile device of a first user;
   receive, via the first communication channel, a request from the first mobile device of the first user to implement a state-dependent resource reconfiguration;
   establish a second communication channel with a second mobile device of a second user;
   receive, via the second communication channel, a request from the second mobile device of the second user to implement the state-dependent resource reconfiguration, wherein the second user and the first user are in a relationship that is characterized by a joint ownership by the first user and the second user of a plurality of shared assets;
   determine a unique identity of the first mobile device and of the second mobile device;
   perform a security check of the first mobile device by (1) determining, based on the unique identity of the first mobile device, that the first mobile device is associated with the first user and (2) determining that the first mobile device is not corrupted with viruses or malware;
   perform a security check of the second mobile device by (1) determining, based on the unique identity of the second mobile device, that the second mobile device is associated with the second user and (2) determining that the second mobile device is not corrupted with viruses or malware; and based on performing the security check of the first mobile device and the security check of the second mobile device, automatically initiate the state-dependent resource reconfiguration, wherein initiating the state-dependent resource reconfiguration comprises automatically:

receiving a preexisting agreement related to the state-dependent resource reconfiguration;

parsing the agreement to identify a plurality of asset category labels;

based on parsing the agreement to identify the plurality of asset category labels, identifying a first set of assets and a second set of assets, wherein the first set of assets comprises a first plurality of assets and wherein the second set of assets comprises a second plurality of assets, and wherein the first set of assets and the second set of assets are mutually exclusive and wherein a combination of the first plurality of assets and the second plurality of assets comprises the plurality of shared assets;

assigning the first set of assets to the first user and assigning the second set of assets to the second user;

changing an identification of a first beneficiary associated with the first set of assets and an identification of a second beneficiary associated with the second set of assets such that the second user is not identified as the first beneficiary and that the first user is not identified as the second beneficiary; and blocking the first user from accessing the second set of assets and blocking the second user from accessing the first set of assets.

2. The system of claim 1, wherein the processing device is further configured to execute the computer-readable program code to:

block all access by the first user and the second user to the plurality of shared assets.

3. The system of claim 1, wherein the processing device is further configured to execute the computer-readable program code to:

apply one or more of the plurality of asset category labels to each shared asset within the plurality of shared assets.

4. The system of claim 3, wherein the processing device is further configured to execute the computer-readable program code to:

assign each shared asset from among the plurality of shared assets to either the first user or the second user based at least in part on the one or more category labels applied to each asset from among the plurality of shared assets.

5. The system of claim 1, wherein the processing device is further configured to execute the computer-readable program code to:

prior to initiating the state-dependent resource reconfiguration, present to the first user and the second user a model depicting an outcome of the state-dependent resource reconfiguration, wherein the outcome comprises a listing of the first plurality of assets and the second plurality of assets.

6. The system of claim 5, wherein the outcome further comprises a simulation of an expected cash flow associated with the first user and an expected cash flow associated with the second user.

7. The system of claim 6, wherein the processing device is further configured to execute the computer-readable program code to:

establish a third communication channel between the first mobile device of the first user and a user device associated with a third user; and establish a fourth communication channel between the second mobile device of the second user and the user device associated with the third user, wherein the third user is unaffiliated with first user and is unaffiliated with the second user.

8. A computer program product for implementing dynamic state-dependent resource reconfiguration, the computer program product comprising at least one non-transitory computer-readable medium having computer-readable program code portions embodied therein, the computer-readable program code portions comprising:

an executable portion configured to establish a first communication channel with a first mobile device of a first user;

an executable portion configured to receive, via the first communication channel, a request from the first mobile device of the first user to implement a state-dependent resource reconfiguration;

an executable portion configured to establish a second communication channel with a second mobile device of a second user;

an executable portion configured to receive, via the second communication channel, a request from the second mobile device of the second user to implement the state-dependent resource reconfiguration, wherein the second user and the first user are in a relationship that is characterized by a joint ownership by the first user and the second user of a plurality of shared assets;

an executable portion configured to determine a unique identity of the first mobile device and of the second mobile device;

an executable portion configured to perform a security check of the first mobile device by (1) determining, based on the unique identity of the first mobile device, that the first mobile device is associated with the first user and (2) determining that the first mobile device is not corrupted with viruses or malware;

an executable portion configured to perform a security check of the second mobile device by (1) determining, based on the unique identity of the second mobile device, that the second mobile device is associated with the second user and (2) determining that the second mobile device is not corrupted with viruses or malware; and an executable portion configured to, based on performing the security check of the first mobile device and the security check of the second mobile device, automatically initiate the state-dependent resource reconfiguration, wherein initiating the state-dependent resource reconfiguration comprises automatically:

receiving a preexisting agreement related to the state-dependent resource reconfiguration;

parsing the agreement to identify a plurality of asset category labels;

based on parsing the agreement to identify the plurality of asset category labels, identifying a first set of assets and a second set of assets, wherein the first set of assets comprises a first plurality of assets and wherein the second set of assets comprises a second plurality of assets, and wherein the first set of assets and the second set of assets are mutually exclusive and wherein a combination of the first plurality of assets and the second plurality of assets comprises the plurality of shared assets;

assigning the first set of assets to the first user and assigning the second set of assets to the second user;

changing an identification of a first beneficiary associated with the first set of assets and an identification of a second beneficiary associated with the second set of assets such that the second user is not identified as the first beneficiary and that the first user is not identified as the second beneficiary; and blocking the first user from accessing the second set of assets and blocking the second user from accessing the first set of assets.

9. The computer program product of claim 8, wherein the computer-readable program code portions further comprise:

an executable portion configured to block all access by the first user and the second user to the plurality of shared assets.

10. The computer program product of claim 8, wherein the computer-readable program code portions further comprise:

an executable portion configured to apply one or more of the plurality of asset category labels to each shared asset within the plurality of shared assets.

11. The computer program product of claim 10, wherein the computer-readable program code portions further comprise:

an executable portion configured to assign each shared asset from among the plurality of shared assets to either the first user or the second user based at least in part on the one or more category labels applied to each asset from among the plurality of shared assets.

12. The computer program product of claim 8, wherein the computer readable program code portions further comprise:

an executable portion configured to, prior to initiating the state-dependent resource reconfiguration, present to the first user and the second user a model depicting an outcome of the state-dependent resource reconfiguration, wherein the outcome comprises a listing of the first plurality of assets and the second plurality of assets.

13. The computer program product of claim 12, wherein the outcome further comprises a simulation of an expected cash flow associated with the first user and an expected cash flow associated with the second user.

14. The computer program product of claim 13, wherein the computer-readable program code portions further comprise:

an executable portion configured to establish a third communication channel between the first mobile device of the first user and a user device associated with a third user; and an executable portion configured to establish a fourth communication channel between the second mobile device of the second user and the user device associated with the third user, wherein the third user is unaffiliated with first user and is unaffiliated with the second user.

15. A computer-implemented method for implementing a state-dependent resource reconfiguration, the method comprising:

establishing, via a computer processor, a first communication channel with a first mobile device of a first user;

receiving, via a computer processor, via the first communication channel, a request from the first mobile device of the first user to implement a state-dependent resource reconfiguration;

establishing, via a computer processor, a second communication channel with a second mobile device of a second user;

receiving, via a computer processor, via the second communication channel, a request from the second mobile device of the second user to implement the state-dependent resource reconfiguration, wherein the second user and the first user are in a relationship that is characterized by a joint ownership by the first user and the second user of a plurality of shared assets;

determining, via a computer processor, a unique identity of the first mobile device and of the second mobile device;

performing, via a computer processor, a security check of the first mobile device by (1) determining, based on the unique identity of the first mobile device, that the first mobile device is associated with the first user and (2) determining that the first mobile device is not corrupted with viruses or malware;

performing, via a computer processor, a security check of the second mobile device by (1) determining, based on the unique identity of the second mobile device, that the second mobile device is associated with the second user and (2) determining that the second mobile device is not corrupted with viruses or malware; and based on performing the security check of the first mobile device and the security check of the second mobile device, automatically initiating, via a computer processor, the state-dependent resource reconfiguration, wherein initiating the state-dependent resource reconfiguration comprises automatically:

receiving a preexisting agreement related to the state-dependent resource reconfiguration;

parsing the agreement to identify a plurality of asset category labels;

based on parsing the agreement to identify the plurality of asset category labels, identifying a first set of assets and a second set of assets, wherein the first set of assets comprises a first plurality of assets and wherein the second set of assets comprises a second plurality of assets, and wherein the first set of assets and the second set of assets are mutually exclusive and wherein a combination of the first plurality of assets and the second plurality of assets comprises the plurality of shared assets;

assigning the first set of assets to the first user and assigning the second set of assets to the second user;

changing an identification of a first beneficiary associated with the first set of assets and an identification of a second beneficiary associated with the second set of assets such that the second user is not identified as the first beneficiary and that the first user is not identified as the second beneficiary; and blocking the first user from accessing the second set of assets and blocking the second user from accessing the first set of assets.

16. The method of claim 15, further comprising:

blocking all access by the first user and the second user to the plurality of shared assets.

17. The method of claim 15, further comprising:

applying one or more of the plurality of asset category labels to each shared asset within the plurality of shared assets.

18. The method of claim 17, further comprising:
assigning each shared asset from among the plurality of shared assets to either the first user or the second user based at least in part on the one or more category labels applied to each asset from among the plurality of shared assets.

19. The method of claim 15, further comprising:
prior to initiating the state-dependent resource reconfiguration, presenting to the first user and the second user a model depicting an outcome of the state-dependent resource reconfiguration, wherein the outcome comprises a listing of the first plurality of assets and the second plurality of assets and a simulation of an expected cash flow associated with the first user and an expected cash flow associated with the second user.

20. The method of claim 19, further comprising:
establishing a third communication channel between the first mobile device of the first user and a user device associated with a third user; and
establishing a fourth communication channel between the second mobile device of the second user and the user device associated with the third user, wherein the third user is unaffiliated with first user and is unaffiliated with the second user.

* * * * *